United States Patent [19]
Kuriki

[11] Patent Number: 5,624,363
[45] Date of Patent: Apr. 29, 1997

[54] MACHINE TOOL HAVING A PROTECTIVE COVER

[75] Inventor: Kazuteru Kuriki, Aichi-ken, Japan

[73] Assignee: Brother Kogyo Kabushiki Kaisha, Nagoya, Japan

[21] Appl. No.: 577,528

[22] Filed: Dec. 22, 1995

[30] Foreign Application Priority Data

Feb. 9, 1995 [JP] Japan .................... 7-021956

[51] Int. Cl.⁶ .................... B23Q 11/00; B23C 9/00
[52] U.S. Cl. .................. 483/3; 29/DIG. 56; 29/DIG. 94; 74/608; 409/134; 451/454
[58] Field of Search ................... 483/3, 31, 13; 29/DIG. 56, 59, 94, 60, 86, 102; 409/137, 134; 408/241.6; 74/608; 219/69.12; 451/451, 454

[56] References Cited

U.S. PATENT DOCUMENTS

| | | | |
|---|---|---|---|
| 4,966,505 | 10/1990 | Winkler et al. | 29/DIG. 56 X |
| 5,181,898 | 1/1993 | Piotrowski | 483/3 |
| 5,263,800 | 11/1993 | Chen | 408/241.6 X |

FOREIGN PATENT DOCUMENTS

| | | | |
|---|---|---|---|
| 2653587 | 6/1978 | Germany | 483/3 |
| 135872 | 6/1979 | Germany | 483/3 |
| 164743 | 7/1986 | Japan | 483/3 |
| 62636 | 3/1988 | Japan | 409/134 |
| 1038167 | 8/1983 | U.S.S.R. | 409/134 |

*Primary Examiner*—William R. Briggs
*Attorney, Agent, or Firm*—Oliff & Berridge

[57] ABSTRACT

A machine tool includes a cover member covering an upper open portion of a movable carriage and at least one chain member to connect the cover member to the carriage. The cover member hangs down the front surface of the carriage and forms a U-shape with the at least one chain member at the lower side of the carriage. Chips that are trapped on the inside of the cover member are discharged through an open portion when the at least one chain member is located at the lowest point of the U-shape through the movement of a column of the machine tool.

20 Claims, 13 Drawing Sheets

RELATED ART

RELATED ART

MACHINE TOOL HAVING A PROTECTIVE COVER

BACKGROUND OF THE INVENTION

1. Field of the Invention

The present invention relates to a machine tool having a column that is movable in at least one direction on a carriage, and more particularly to a machine tool having a cover member for covering an open portion on an upper surface of a carriage.

2. Description of Related Art

FIG. 11 depicts a related machine tool 101 having a main shaft head 106 that supports a tool 107 for processing a workpiece (not shown). A column 105 supports the main shaft head 106. The column 105 is located on a carriage 104 and is freely slidable along an axis in a forward and backward direction. The carriage 104 is freely slidable along another axis in right and left directions. The carriage 104 contains an open upper portion. The carriage 104 further includes a driving mechanism for moving the column 105. The driving mechanism includes a Z-axis feeding screw 117, a Z-axis feeding screw nut 116 and, a Z-axis guide 115, which are positioned in open the upper portion of the carriage 104.

The machine tool 101 includes cover member 131 that covers the upper opened portion of the carriage 104, as shown in FIG. 11. The cover member 131 prevents chips produced during processing of a workpiece and cutting oil from entering the driving mechanism. The cover member 131 follows the forward and backward movement of the column 105. One end 131A of the cover member 131 is secured to a front lower end portion 105A of the column 105, as shown in FIG. 11. The cover member 131 extends over the upper side of the carriage 104 and down the front side of the carriage 104. The cover member 131 is bent in U-shape and then fixed to the carriage 104, as shown in FIGS. 11 and 12.

As described above, the cover member 131 hangs down at the front side of the carriage 104 and is fixed to the carriage 104, as shown in FIG. 12. This arrangement of the cover member 131, however, causes chips 144 to be trapped inside the cover member 131, as shown in FIG. 12. The trapped chips 144 prevent a smooth movement of the column 105.

SUMMARY OF THE INVENTION

An object of the present invention is to overcome the above problems by providing a machine tool that is capable of discharging chips trapped inside of a cover member. This and other objects of the invention are achieved by providing a machine tool having a cover member with one end fixed to a column and another portion that covers an upper opened portion of a carriage. The other portion hangs down on the side surface of the carriage. A free end of the cover member is connected to an open portion forming assembly, that forms an open portion through which chips trapped on the inside of the cover member can fall down. One end of the open portion forming assembly is secured to the carriage and the other end thereof is secured to the free end portion of the cover member.

The open portion forming assembly preferably includes at least one chain member secured to the free end of the cover member. The open portion forming assembly and the cover member together form a U-shape at the lower side of the carriage. Chips that are trapped on the inside of the cover member fall down through the open portion when the open portion forming assembly is located at the lowest point of the U-shaped portion through movement of the column. The open portion forming assembly is located at the lowest point of the U-shaped portion when the column is moved to a tool exchange position. Similarly, the open portion forming assembly may be located at the lowest point of the U-shaped portion after the column is moved when a predetermined time elapses from the start of a machining operation.

The cover member is positioned on the machine tool so that one end thereof is fixed to the column of the machine tool. A hanging portion of the cover member extends over the upper open portion of the carriage and hangs down on a side surface of the carriage. The open portion forming assembly is connected to the free end of the cover member and to the carriage. The open portion forming assembly forms an open portion through which chips trapped on the inside of the cover member fall. The open portion forming assembly and the cover member form a U-shape at the lower side of the carriage. The chips trapped on the inside of the cover member fall to the outside when the open portion forming assembly is located at the lowest point of the U-shaped portion through the movement of the column.

As described above, according to the machine tool of the present invention, the chips trapped on the inside of the cover member can be discharged to the outside, so that the movement of the machine tool can be smoothly performed.

BRIEF DESCRIPTION OF THE DRAWINGS

The invention will be described in conjunction with the following drawings in which like reference numerals designate like elements and wherein.

DETAILED DESCRIPTION OF PREFERRED EMBODIMENT

Preferred embodiments of the present invention are explained hereafter with reference to the accompanying drawings.

Figure 1:
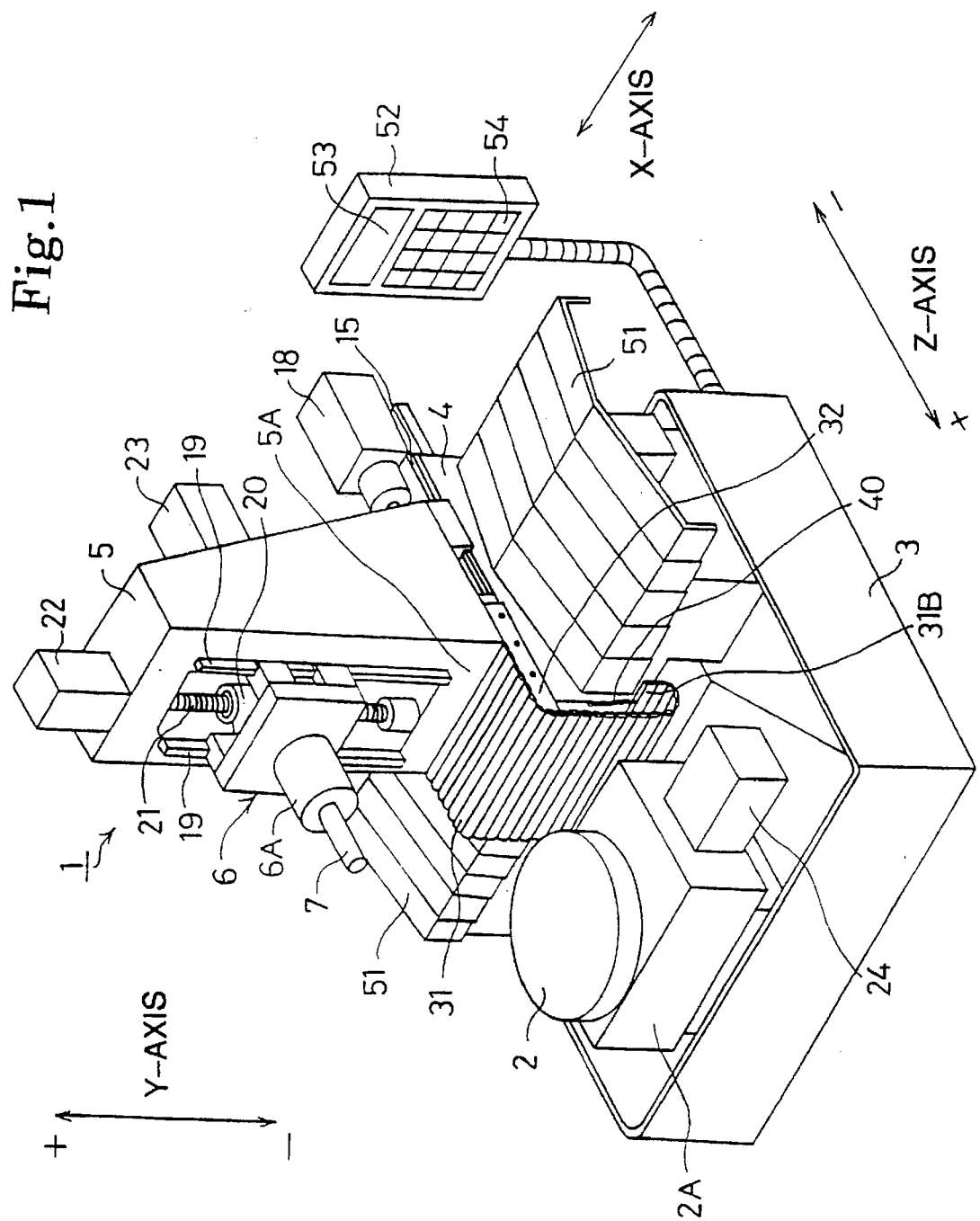
FIG. 1 is a perspective view depicting a machine tool according to an embodiment of the present invention.

A machine tool 1 such as, for example, a lateral-type machining center is illustrated in FIG. 1. The machine tool performs, for example, a cutting operation or other machining operation on a workpiece (not shown) mounted on a rotational table 2 in a horizontal direction. The machine tool 1 includes a carriage 4 that is located on a base 3 and is slidable along an X-axis with respect to a laterally-placed workpiece. A column 5 is located on the carriage 4 and is slidable along the carriage along a Z-axis. The column 5 includes a main shaft head 6 that is slidable along a vertical Y-axis. A tool 7 for performing a machining operation on the workpiece is secured to the main shaft head 6. An operation panel 52 having a display unit 53 and a switch panel 54 is connected to the machine tool 1, as shown in FIGS. 1 and 2.

Figure 2:
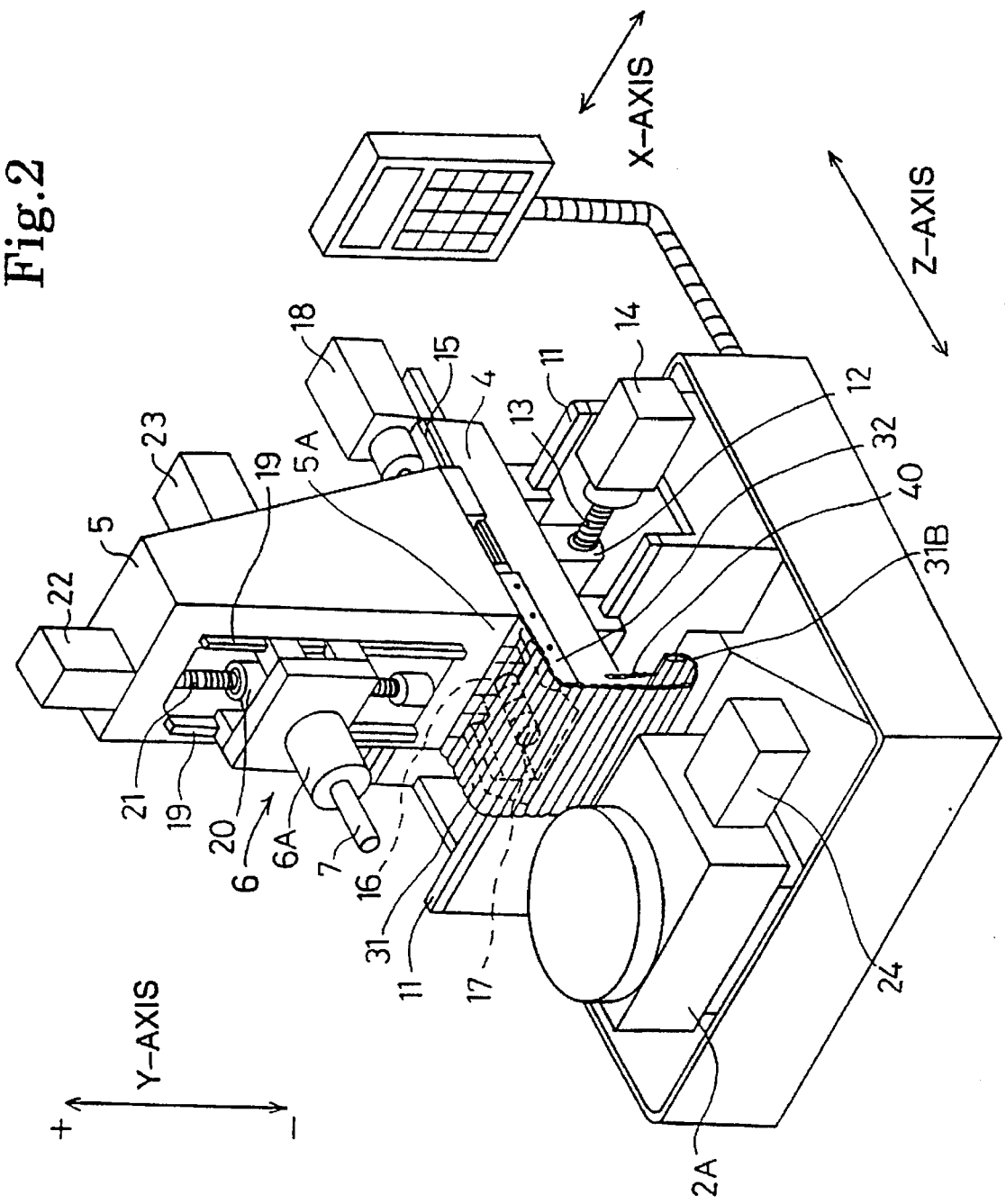
FIG. 2 is a perspective view depicting the machine tool of FIG. 1 with an X-axis cover detached.

As shown in FIG. 2, the carriage 4 is slidably mounted on an X-axis guide 11. An X-axis feeding screw nut 12 is fixed to a lower side of the carriage 4. An X-axis feeding screw 13 is threaded into the X-axis feeding screw nut 12. The X-axis feeding screw 13 is connected to an X-axis motor 14, such that rotational motion of the screw 13 is controlled through the rotation of the X-axis motor 14. The rotation of the screw 13 produces movement of the carriage 4 along the X-axis.

Figure 3:
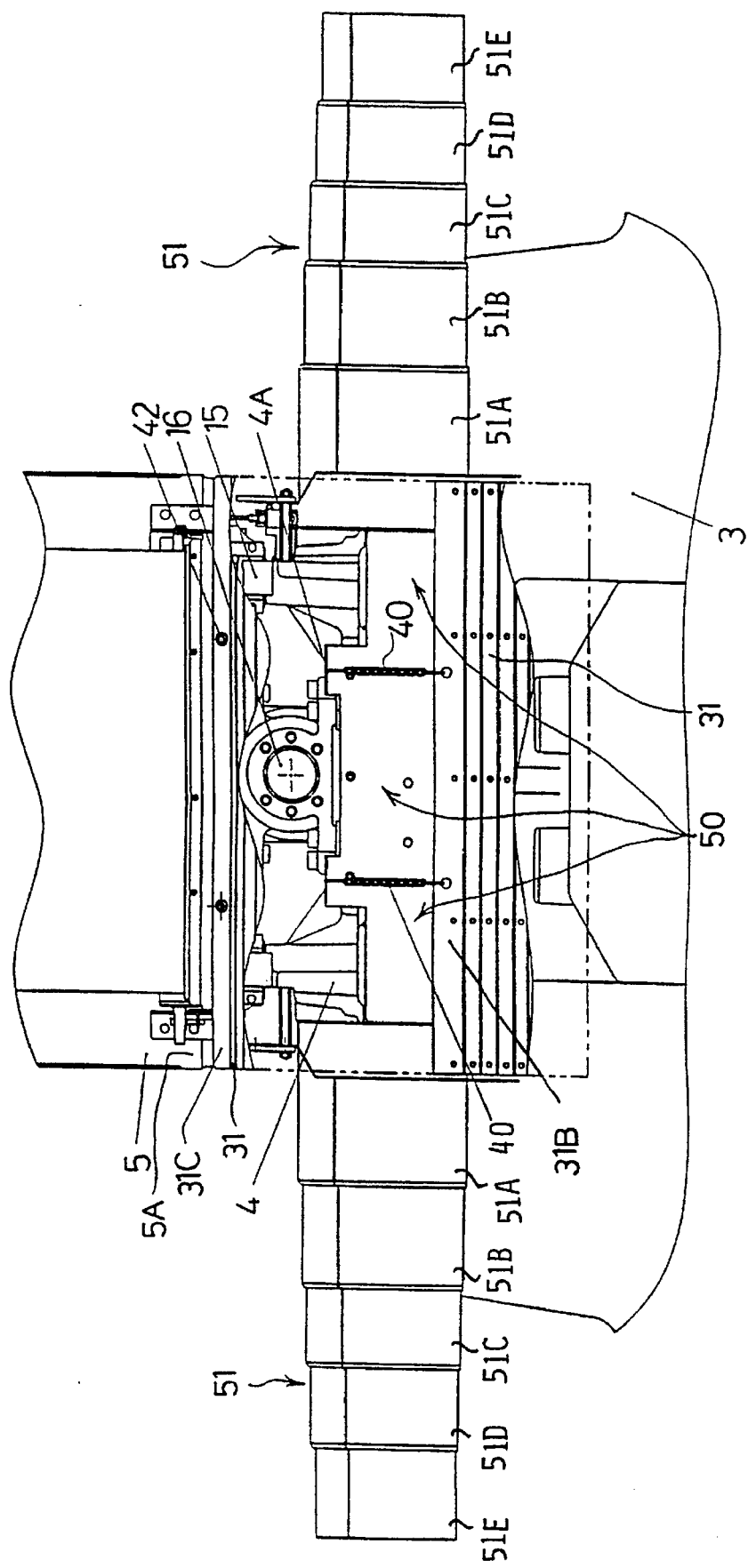
FIG. 3 is a front view depicting the machine tool having portion of a cover member partially removed.

An X-axis cover member 51 is connected to the carriage 4, as shown in FIGS. 1 and 3. The cover member 51 prevents chips produced during the machining operation and oil from contacting the X-axis feeding screw 13 and the X-axis feeding screw nut 12 to insure smooth movement of the carriage 4 along the X-axis. The cover member 51 extends from opposite sides of the carriage 4 and includes a plurality of interlocking plate members 51A–51E. The cover member 51 expands and contracts with movement of the carriage 4 along the X-axis to cover the open upper portion of the guide 11. The interlocking plate members 51A–51E are slidably interconnected such that the cover member 51 expands and contracts as the carriage 4 moves.

The column 5 is slidably mounted on a Z-axis guide 15. A Z-axis feeding screw nut 16 is fixed to a lower side of the column 5. A Z-axis feeding screw 17 is threaded into a Z-axis feeding screw nut 16. The Z-axis feeding screw 17 is connected to a Z-axis motor 18, such that the rotational motion of the screw 17 is controlled through the rotation of the Z-axis motor 18. The rotation of the screw 17 produces movement of the column 5 along the Z-axis.

The main shaft head 6 is slidably supported by a Y-axis guide 19 so as to be vertically slidable along the Y-axis. A Y-axis feeding screw nut 20 is fixed to the main shaft head 6. A Y-axis feeding screw 21 is threaded into the Y-axis feeding screw nut 20. The Y-axis feeding screw 21 is connected to a Y-axis motor 22, such that the rotational motion of the screw 21 is controlled through the rotation of the Y-axis motor 22. The rotation of the screw 21 produces movement of the main shaft head 6 in the vertical direction.

The main shaft head 6 is also connected through a rotation transmission mechanism (not shown) to a main shaft motor 23 provided on a back surface of the column 5. The rotation of a main shaft 6A of the main shaft head 6 is controlled by the main shaft motor 23.

A rotational table 2 is rotatably mounted on a rotational table stand 2A located on the base 3. The rotational motion of the table 2 is controlled by a B-axis motor 24 provided on a side surface of the rotational table stand 2A.

The column 5 moves along the Z-axis relative to the carriage 4. To permit this movement, the carriage 4 is open on an upper side thereof so that the driving mechanism including the Z-axis feeding screw 17, the Z-axis feeding screw nut 16, etc. is exposed, as shown by a broken line in FIG. 2. To prevent chips and cutting oil from entering through the open upper surface of the carriage 4 into the driving mechanism, a cover member 31 is provided, as shown in FIGS. 1 and 2, to cover the open upper surface of the carriage 4. The cover member 31 must follow movement of the carriage 4 and the column 5.

One end portion 31C of the cover member 31 is fixed to a lower end portion 5A on a front surface of the column 5, as shown in FIGS. 1–3. The cover member 31 passes over the open upper surface of the carriage 4 and hangs down at the front side of the carriage 4, as shown in FIGS. 1 and 2. The dead weight of the hanging portion 31B of the cover member 31 applies tension to the portion of the cover member 31 which passes over the open upper portion of the carriage 4. Two chain members 40 are secured to an opposite end portion 31D of the cover member 31 to attach the cover member 31 to a fixing portion 4A on a lower end side of the carriage 4.

Figure 4:
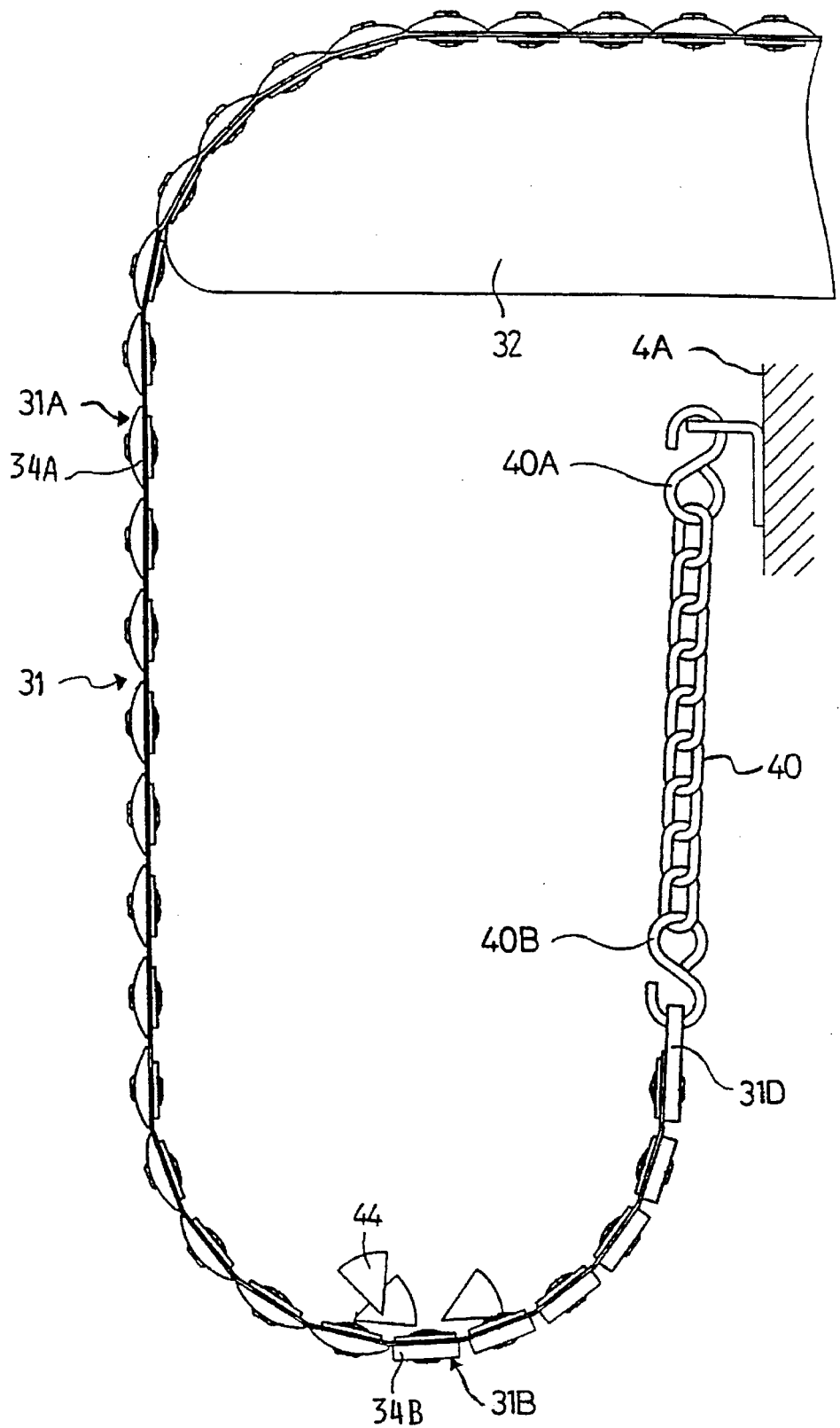
FIG. 4 is a side view of the cover member according to the present invention illustrating chips trapped inside the cover member.
Figure 5:
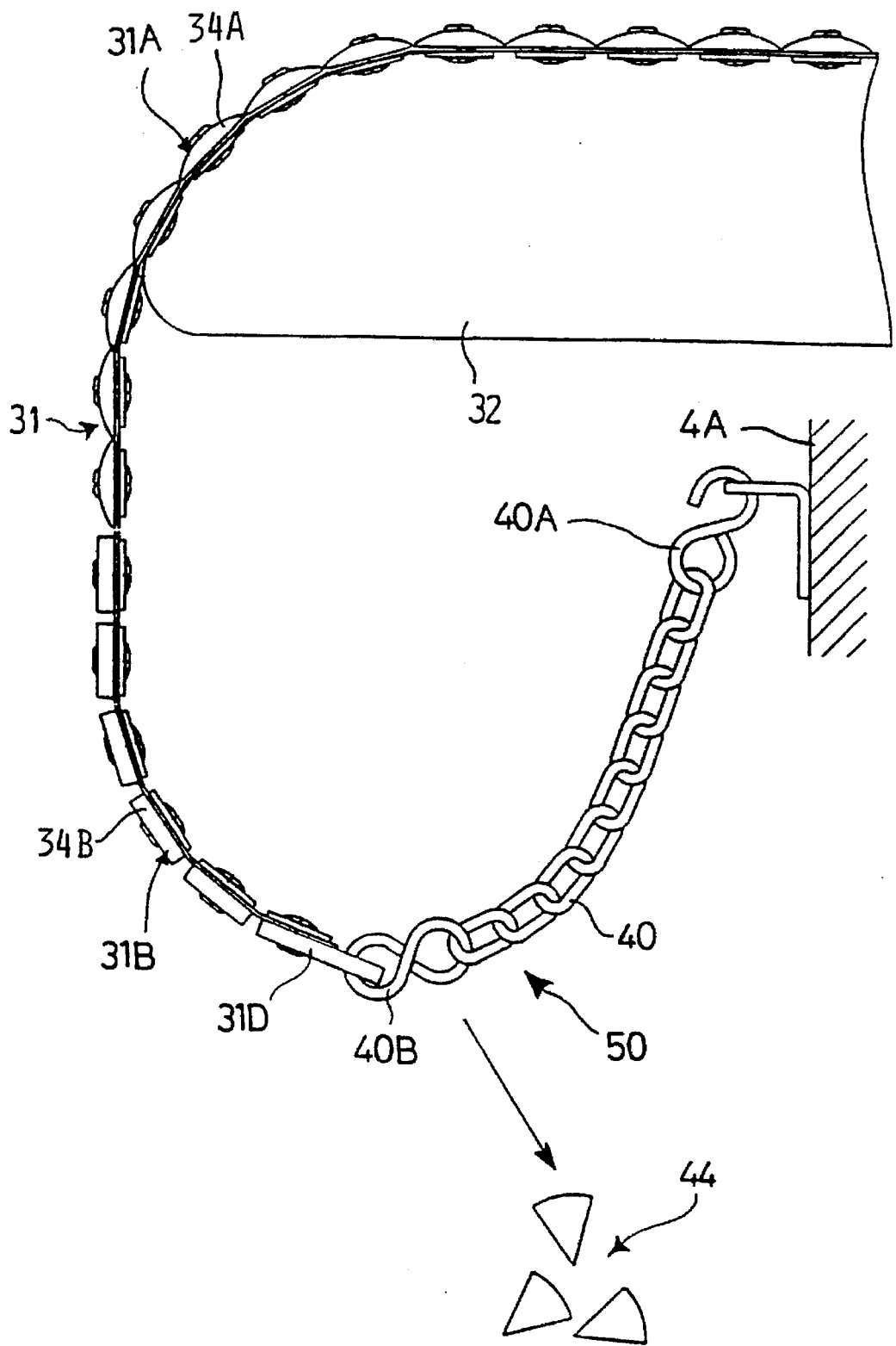
FIG. 5 is a side view of the cover member according to the present invention illustrating chips being discharged from the cover member through an open portion.

As shown in FIGS. 1, 4 and 5, two sliding members 32 are disposed in parallel at the front end portion of the carriage 4. The sliding members 32 serve as a guide for the cover member 31 to permit sliding of the cover member 31 along the upper surfaces of the sliding members 32.

Figure 6:
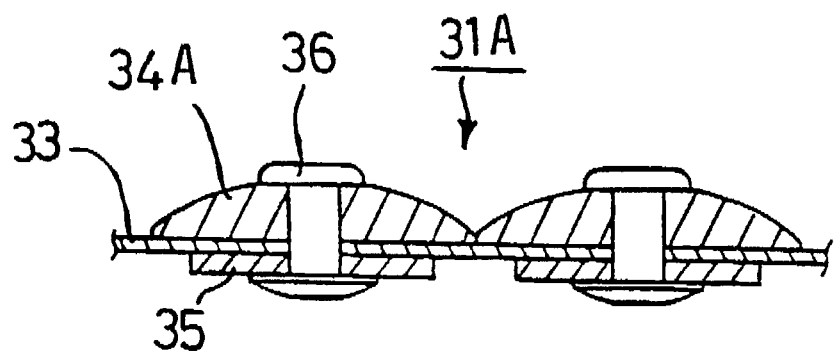
FIG. 6 is a cross-sectional view illustrating an upper portion of the cover member according to the present invention.

The cover member 31 includes a plurality of interconnected rod members 34, as shown in FIG. 6. A weight relationship (i.e., the weight per unit length) of the rod members 34B of the portion 31B that move in a vertical direction is larger than the weight relationship of the rod members 31A located adjacent the portion 31A that move in a substantially horizontal direction while passing over the upper open portion of the carriage 4.

The upper portion 31A of the cover member 31 that moves in a substantially horizontal direction includes a plurality of rod members 34A that are attached to a flexible plate 33 (such as, for example, a flexible rubber plate) extend in a horizontal direction as shown in FIG. 6. An upper portion of each rod member 34A has a curved surface while the lower portion thereof has a flat surface. The rod members 34A are fixed to the flexible plate 33 using a suitable fastener (such as, for example washers 35 and rivets 36).

The portion 31B of the cover member 31 that moves vertically includes a plurality of rod members 34B. The rod member 34B have a different cross section as compared to the cross section of the rod members 34A, as shown in FIGS. 4 and 5. The rod members 34B have a rectangular cross section and are heavier than the rod members 34A. Each washer 35 is formed of a rigid metal member. The washers 35 contact the sliding members 32 as the cover member 31 moves. This arrangement produces a higher abrasion resistance as compared to a cover member 31 in which the flexible plate 33 directly contacts the sliding members 32.

The chain members 40 form an open portion each forming assembly. As shown in FIGS. 3–5, one end 40A of each chain member 40 is secured to the fixing portion 4A of the carriage 4. An opposite end 40A is secured to the end portion 31D of the cover member 31. The chain members 40 form open portions 50 between the carriage 4 and the cover member 31, as shown in FIG. 3. As shown in FIGS. 4 and 5, the chain members 40 form a U-shape with the hanging portion 310 of the cover member 31 at the lower side of the carriage 4. When the column 5 is moved to the stroke end (i.e., the column 5 is at a position furthest from the table 2) in this arrangement, the chain member 40 reaches the lowest point of the U-shape and the chips 44 that are trapped inside the cover member 31 fall down through the open portions 50, as shown in FIG. 5. The chips 44 are dislodged from the cover member 31 and fall onto the base 3. A liquid coolant carries the chips 44 to a recycle box (not shown).

Other suitable connecting assemblies may be used in place of the chain member 40 to connect the cover member 31 to the carriage 4. A belt formed, for example, of rubber, synthetic resin or leather may be used. Similarly, a metal strip (such as, for example, a stainless steel strip), glass fiber or the like and a string-shaped member (such as, for example, wire rope, nylon rope or like) may also be used. A mesh member having openings sized to permit chips to fall therethrough may also be used.

Figure 10A:
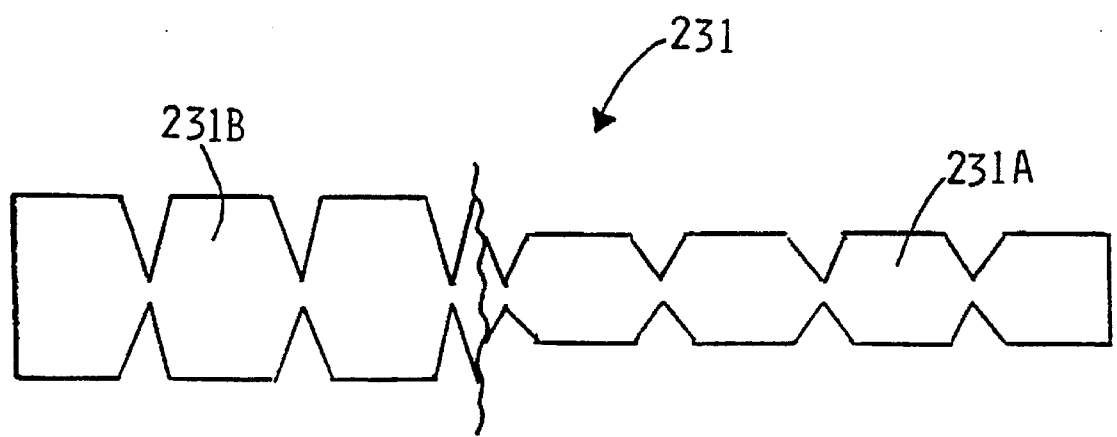
FIG. 10A illustrates a side view of another cover member according to the present invention.
Figure 10B:
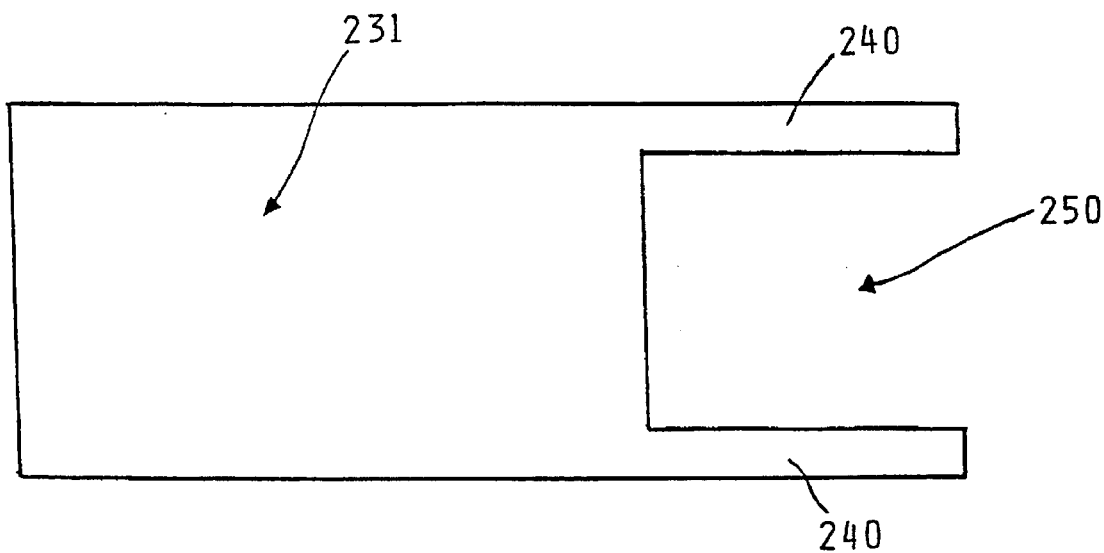
FIG. 10B illustrates another cover member and open portion forming assembly according to the present invention.
Figure 10C:
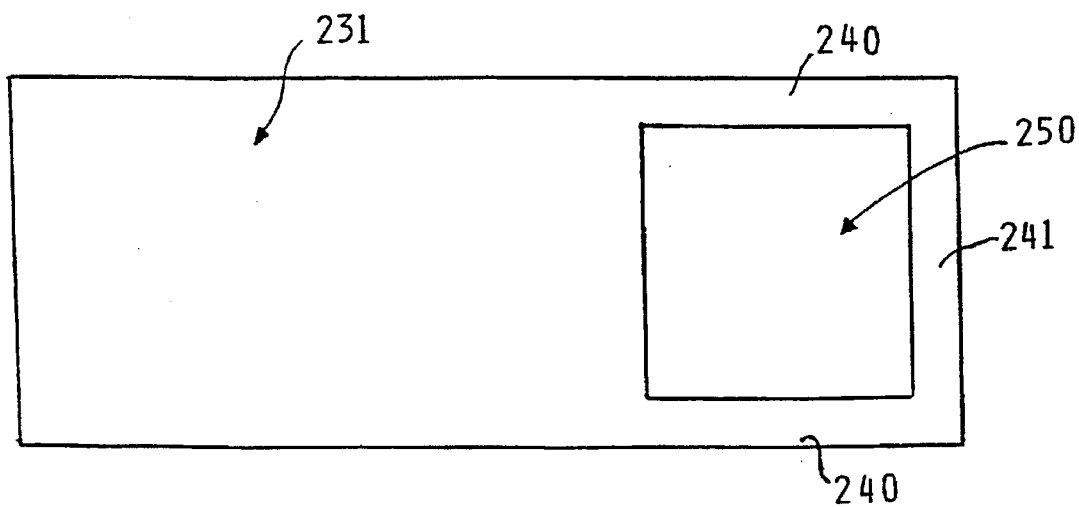
FIG. 10C illustrates another cover member and open portion forming assembly according to the present invention.
Figure 11:
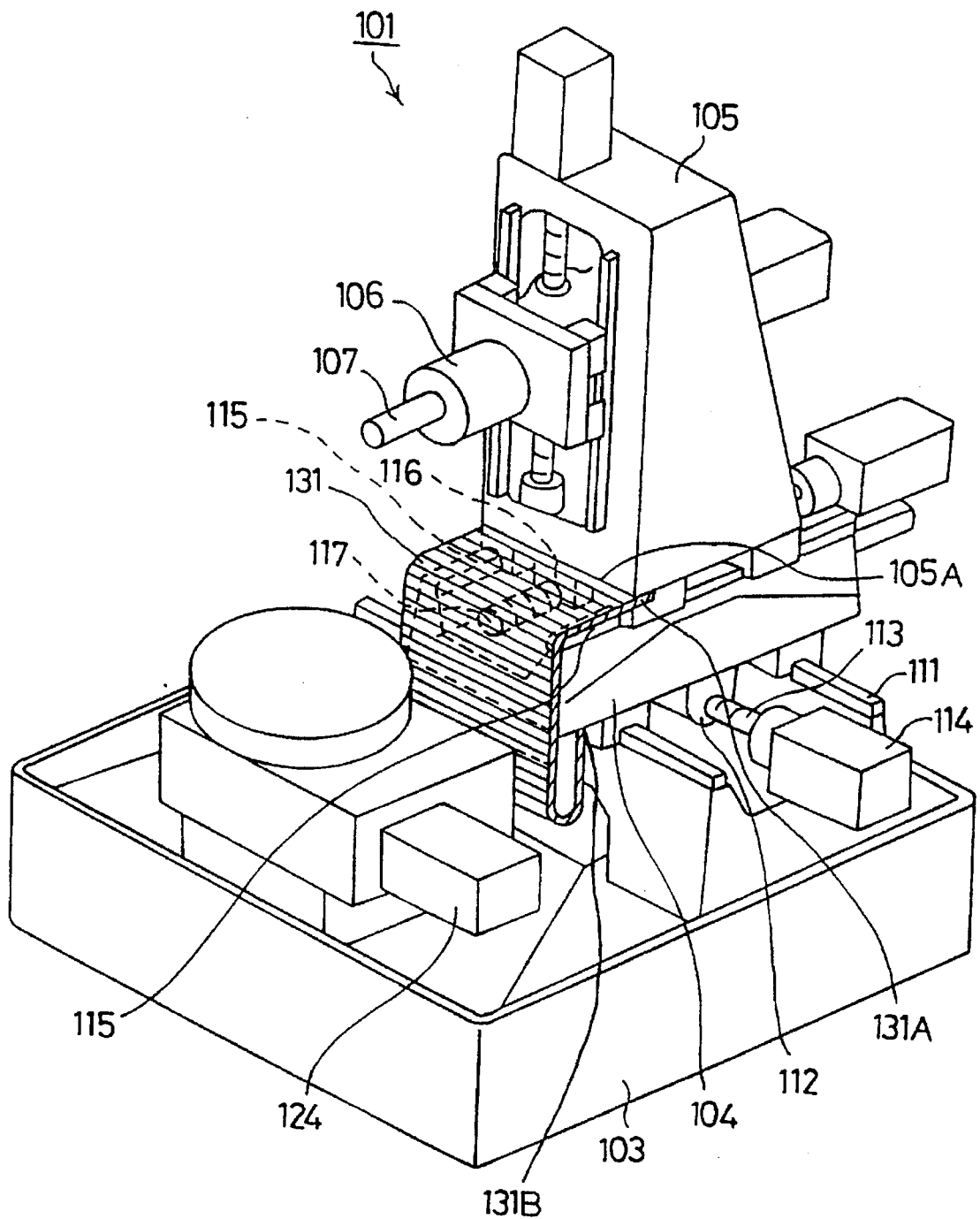
FIG. 11 is a perspective view of a related machine tool.
Figure 12:
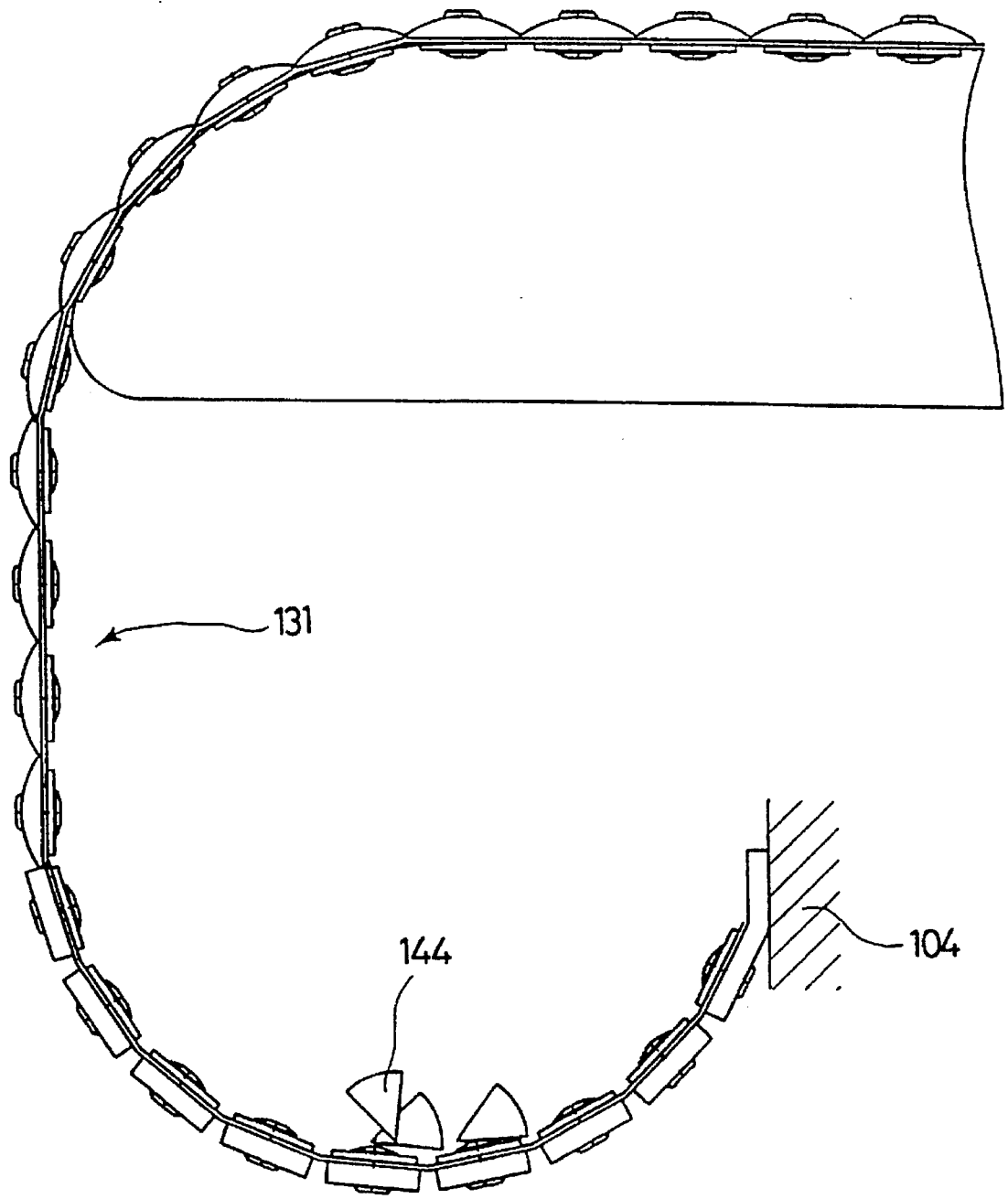
FIG. 12 is a side view depicting chips trapped on the inside of a cover member of the related machine tool.

Alternatively, the cover member may be formed as a single unit with the opening portion forming assembly. In FIGS. 10B and 10C, the cover member 231 is formed with spaced extensions 240 that secure the cover member 231 to the carriage 4. The spaced extensions 240 may be interconnected by portion 241 to form an opening 250, as shown in FIG. 10C. The cover member 231 and spaced extensions 240 may be formed of a single sheet of flexible or molded plastic that preferably resists abrasion. The cover member 231 may include integrally formed rod portions 231A and 231B, as shown in FIG. 10A, or include attached rod members 31A and 31B, as discussed above.

The operation of the machine tool 1 will now be described. When the machine tool 1 starts a machining operation under control of a controller (not shown), the column 5 moves allowing the Z-axis on the carriage 4. The machine tool scatters chips 44 and cutting oil during the machining operation. The cover member 31 prevents the chips 44 and cutting oil from entering the upper open portion of the carriage 4 during the forward and backward movement of the column along the Z-axis. The cover member 31 moves integrally with column 5.

The U-shape design of the cover member 31 and the chain member 40 may permit chips 44 to enter the cover member 31 from a side portion of the cover member 31. The chips 44 are most likely to enter the inside of the cover, as shown in FIG. 4, when the hanging portion 31B of the cover member 31 is in the lowest vertical position. Chips trapped inside the cover member may disturb the smooth movement of the column 5. However, when the column 5 is backwardly moved to the stroke end (i.e., the position furthest from the table 2) the chain member 40 is located at the lowest point of the U-shape, as shown in FIG. 5. As a result, the chips 44 that are trapped inside of the cover member 31 fall through the open portion 50. Similarly, the chips 44 that are trapped inside the cover member 31 may be discharged through the open portion 50 when the column 5 is moved to the stroke end at a suitable time (such as, for example, when the tool 7 is exchanged after a predetermined time elapses from the start of a machining operation or at time selected by a user).

Figure 7:
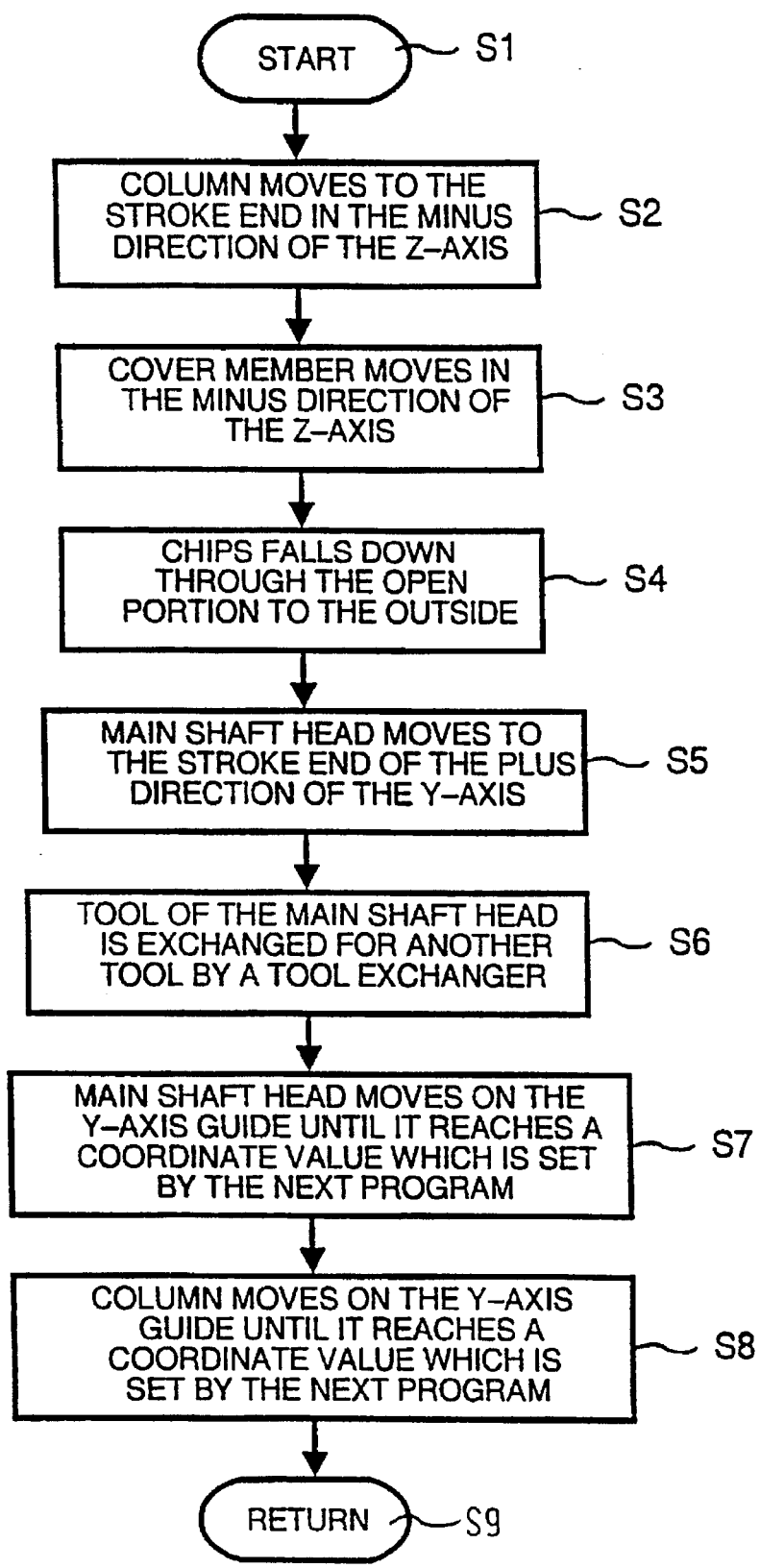
FIG. 7 is a flowchart depicting a control operation for discharging chips from the machine tool during a tool exchange operation.

A tool exchange operation during which chips are dislodged from the cover member 31 will be described with reference to the flowchart of FIG. 7. A main program executed, for example, by a controller, controls the operation of the machine tool 1. When a tool exchange step is selected, a subroutine for tool exchange is started in step S1. In step S2, the column 5 moves to the stroke end in the minus direction of the Z-axis along the Z-axis guide 15 of the carriage 4. The cover member 31 in step S3 also moves in the minus direction of the Z-axis. The chain members 40 are positioned beneath the sliding members 32 such that the chain members 40 are located at the lowest point of the U-shape of the cover member 31. In step S4, the chips 44 that are trapped on the inner surface of the cover member 31 fall through the open portion 50. Subsequently, the main shaft head 6 moves in step S5 along the Y-axis guide 19 of the column 5 to the stroke end of the positive direction of the Y-axis. In step S6, the tool 7 of the main shaft head 6 is exchanged for another tool using a tool exchanger (not shown). In step S7, the main shaft head 6 is moved to a preset location on the Y-axis guide 19 until it reaches a preset coordinate value. In step S8, the column 5 also moves on the Z-axis guide 15 until it reaches a preset coordinate value. The tool exchange subroutine is complete and the operation of the machine tool 1 returns to the main program in step S9.

Figure 8:
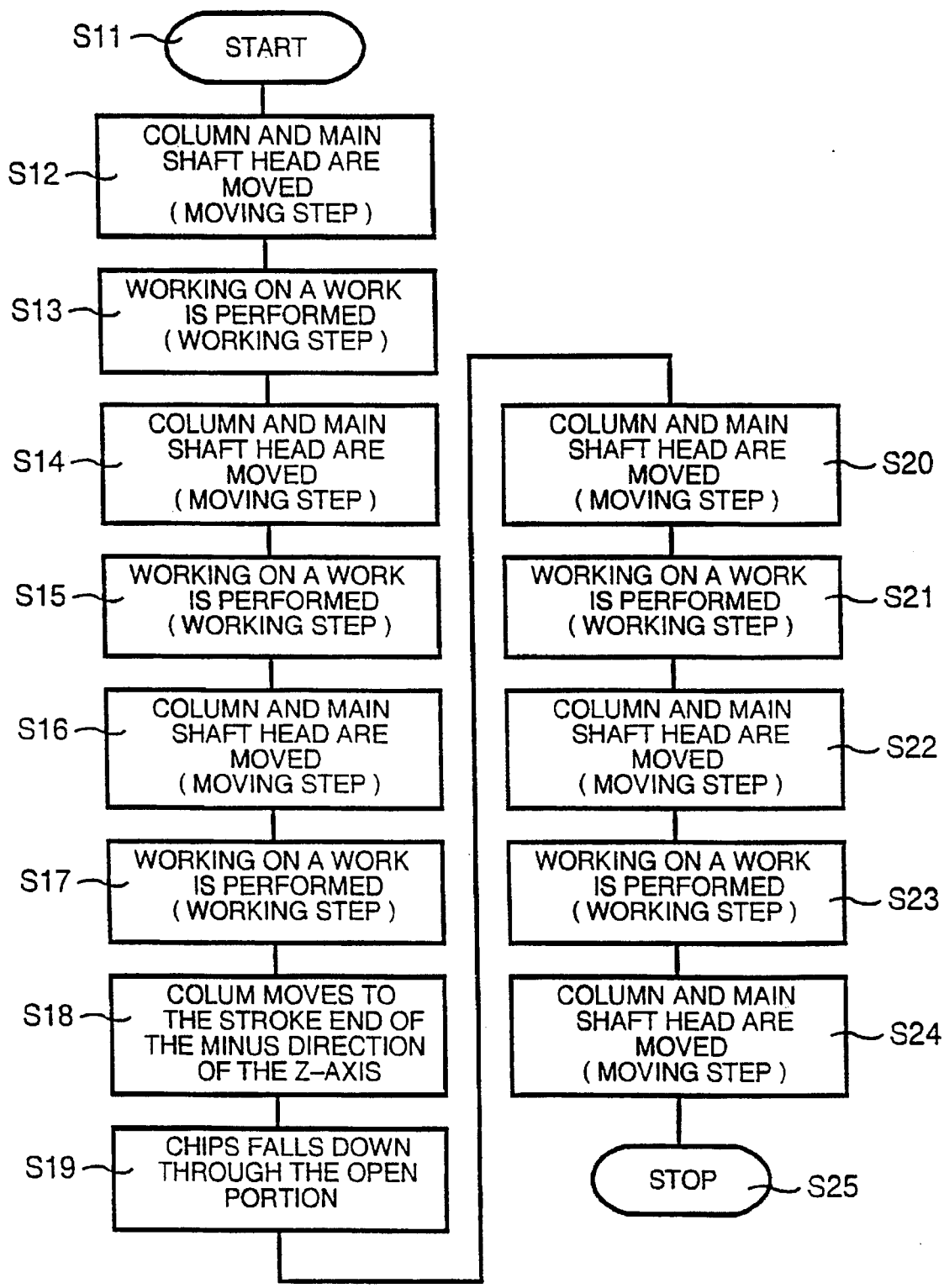
FIG. 8 is a flowchart depicting an NC working process or program for the control operation for discharging chips after a predetermined time.

The dislodging of chips 44 after a predetermined time elapses from the start of the machining operation will be described with reference to a flowchart of an NC (numerical control) working process or program of FIG. 8. In step S11, the machine tool 1 starts a NC program. The column 5 and the main shaft head 6 are first moved in step S12 to a desired machining location. The machining of the workpiece is performed in step S13. After the moving and working steps, as described above, are successively repeated (that is, the machining operation is performed for a predetermined time in steps S14–S17) the column 5 temporarily moves in step S18 on the Z-axis guide until it reaches the stroke end of the minus direction of the Z-axis. Accordingly, the chain members 40 are moved in step S18 to the lowest point of the U-shape of the cover member 31, so that the chips 44 that are trapped inside the cover member 31 fall through the open portion 50 due to gravity in step. Subsequently, the moving and working steps, as described above, are successively repeated in steps S20–S24. The NC program for the machine tool is completed in step S25.

As described above, the moving step of the column to the stroke end of the Z-axis (i.e., step S18) is inserted after a predetermined number of working steps. The dislodging operation of chips after a predetermined time elapses from the start of the machining operation can be performed without a time counting device, such as a timer by dislodging the chips after a predetermined number of machining operations. The dislodging operation, however, may be performed when a predetermined time elapses from the start of the machining operation by actually counting a working time with a timer or the like without the use of a NC program. Alternatively, the user may operate the switch panel 54 of the operation panel 52 to move the column 5 perform the dislodging operation of the chips.

Figure 9:
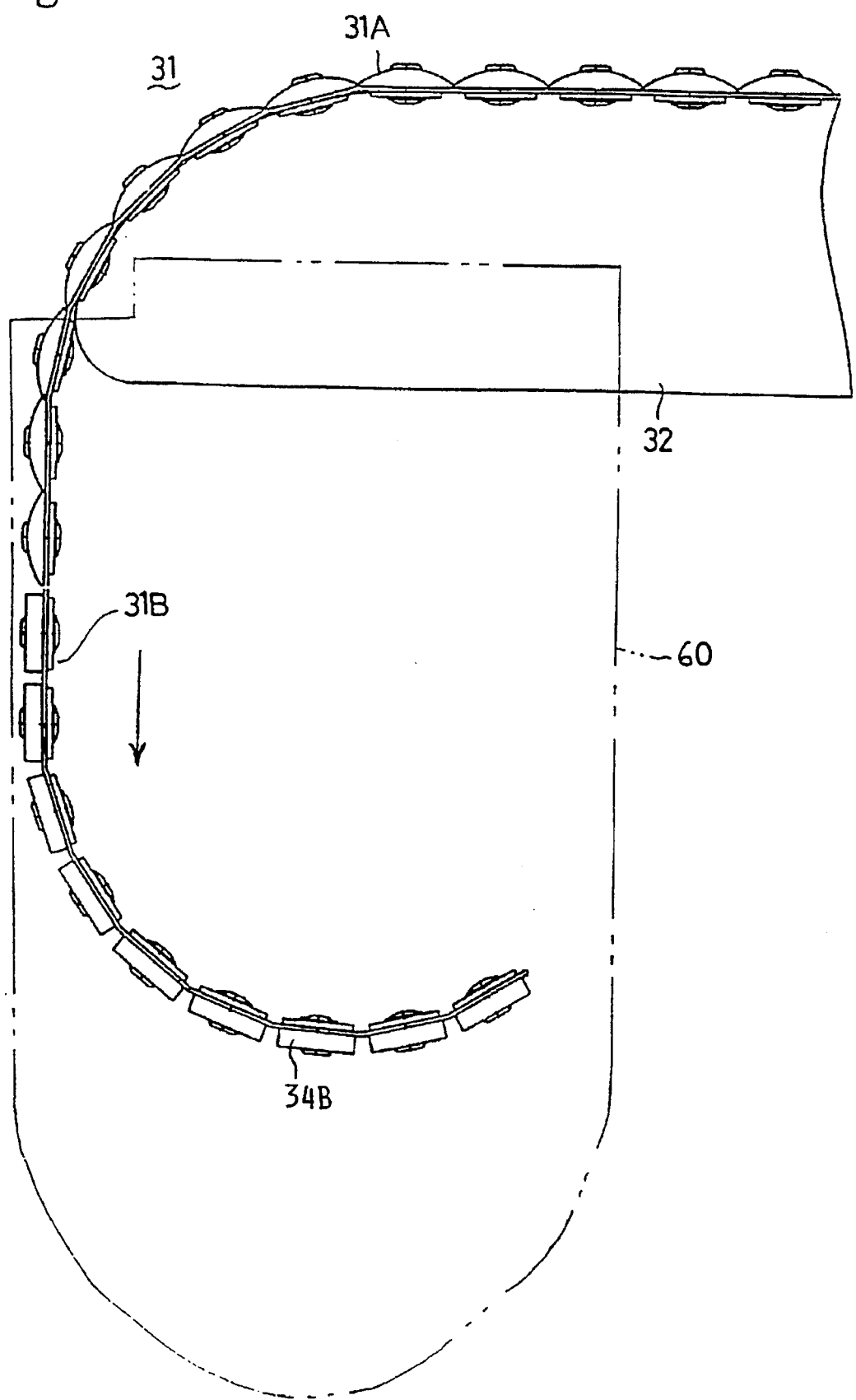
FIG. 9 is a partial side view depicting an invasion preventing plate with the cover member according to the present invention.

Additionally, an invasion-preventing plate 60 may be fixed to a side surface of each of the sliding members 32, as shown in FIG. 9. The plates 60 guide the U-shaped cover member 31 and further prevent the entry of chips 44 from the sides of the cover member 31.

Since the ends of the chain members 40 are fixed to the fixing portion 4a of the carriage 4, the clearance between the end portion 31D of the cover member 31 and the base 3 at the lower side thereof may be set to be a smaller value than that in the case where the end portion of the cover member 31 is merely hangs down. The shift amount of the U-shaped lower end portion of the cover member 31 is reduced to a half of that of the column, and thus the end portion of the cover member 31 does not contact the base 3. As a result, the tension to be applied to the cover member 31 is not reduced. Accordingly, a sufficient tension can be applied to the cover member 31 even when the column 5 is shifted by a large distance.

While this invention has been described in conjunction with specific embodiments thereof, it is evident that many alternatives, modifications and variations will be apparent to those skilled in the art. Accordingly, the preferred embodiments of the invention as set forth herein are intended to be illustrative not limiting. Various changes may be made without departing from the spirit and scope of the invention as defined by the following claims.

What is claimed is:

1. A machine tool comprising:

a carriage having an open upper portion;

a column movably mounted on said carriage and having a tool mounted thereon;

a driving mechanism for moving said column positioned on said carriage, said driving mechanism being located in said open upper portion; and a movable protective cover for covering at least a portion of said open upper portion of said carriage during movement of said column, said movable protective cover including, a cover member having an end portion connected to said column, a hanging portion that covers said open upper portion of said carriage and hangs adjacent a side surface of said carriage, and an opposite end portion, and dislodging means for dislodging chips formed during a machining operation of the machine tool that are trapped within said cover member.

2. The machine tool according to claim 1, wherein said dislodging means includes open portion forming means for forming an open portion between said cover member and said carriage for removing chips trapped on an inside portion of said cover member, whereby the chips fall through said open portion.

3. The machine tool as claimed in claim 2, wherein said open portion forming means includes at least one flexible member having one end secured to said opposite end of said cover member and another end secured to said carriage.

4. The machine tool according to claim 2, wherein said hanging portion of said cover member and said open portion forming means form a U-shaped assembly that extends downwardly from a lower side of said carriage, whereby the chips trapped inside said cover member fall through said open portion when said open portion forming means is located at a lowest point of said U-shaped assembly during movement of said column.

5. The machine tool according to claim 4, wherein said open portion forming means is located at said lowest point of said U-shaped assembly when said column is moved to a tool exchange position during a tool exchanging operation of said machine tool.

6. The machine tool according to claim 4, wherein said open portion forming means is located at said lowest point of said U-shaped assembly when said column is moved is moved after a predetermined time elapses during a machining operation of said machine tool.

7. The machine tool according to claim 1, wherein said dislodging means includes first securing means for securing said dislodging means to said carriage and second securing means for securing said dislodging means to said opposite end portion of said cover member.

8. The machine tool according to claim 1, further comprising guide means for guiding said cover member over said open upper portion of said carriage during movement of said column.

9. The machine tool according to claim 1, wherein said cover member includes open side portions, and said machine tool further comprising preventing means for preventing the chips from entering said open side portions of said cover member.

10. The machine tool according to claim 9, wherein said preventing means further guides said cover member over said open upper portion of said carriage during movement of said column.

11. The machine tool according to claim 1, wherein said cover member and said dislodging means are formed as a single unit.

12. The machine tool according to claim 11, wherein said dislodging means includes at least one flexible extension extending from said opposite end portion of said cover member.

13. A movable protective cover for a machine tool having a movable column mounted on a carriage with an open upper portion, said movable protective cover comprising:

a cover member having an end portion connected to the column, a hanging portion that covers the open upper portion of the carriage and hangs adjacent a side surface of the carriage, and an opposite end portion; and dislodging means for dislodging chips that are trapped within said cover member.

14. The flexible protective cover according to claim 13, wherein said dislodging means includes open portion forming means for forming an open portion between said flexible cover means and the carriage for removing the chips trapped on an inside portion of said cover member, whereby the chips fall through said open portion of said open portion forming means.

15. The flexible protective cover according to claim 14, wherein said open portion forming means includes at least one flexible member having one end secured to said cover member and another end secured to the carriage.

16. The flexible protective cover according to claim 14, wherein said cover member and said open portion forming means form a U-shaped assembly adapted to extend downwardly from a lower side of the carriage, whereby the chips trapped inside said cover member fall through said open portion when said open portion forming means is located at a lowest point of said U-shaped assembly during movement of the column.

17. The flexible protective cover according to claim 13, wherein said cover member includes a flexible plate having a plurality of rod members thereon.

18. The flexible protective cover according to claim 17, wherein each of said plurality of rod members has a weight relationship, and said rod members positioned adjacent said opposite end portion having a greater weight relationship than said rod members positioned adjacent said end portion.

19. The flexible protective cover according to claim 17, wherein said plurality of rod members and said flexible plate are formed as a single unit.

20. The flexible protective cover according to claim 13, further comprising abrasion protection means for protecting said cover member from abrasion when said cover member contacts the carriage.

* * * * *